(No Model.)

A. T. ALLEN.
METALLIC PACKING FOR PISTONS.

No. 412,227. Patented Oct. 8, 1889.

*Fig.4*     *Fig.5.*

Witnesses.
Rob⁺ F. Drury.
Bernard C. Drury.

Inventor
A. T. Allen

UNITED STATES PATENT OFFICE.

ARTHUR T. ALLEN, OF SHEFFIELD, COUNTY OF YORK, ENGLAND.

METALLIC PACKING FOR PISTONS.

SPECIFICATION forming part of Letters Patent No. 412,227, dated October 8, 1889.

Application filed June 13, 1889. Serial No. 314,102. (No model.) Patented in England August 3, 1888, No. 11,228.

*To all whom it may concern:*

Be it known that I, ARTHUR THOMAS ALLEN, a resident of Sheffield, county of York, England, and a subject of the Queen of Great Britain, have invented certain new and useful Improvements in Metallic Packing for Pistons, (patented to me in Great Britain under date of August 3, 1888, No. 11,228;) and I do hereby declare that the following is a full, clear, and exact description thereof, reference beng had to the accompanying drawings, which form a part of this specification.

This invention of improvements in metallic packing for pistons, and which may be also used for other purposes where an elastic or expansible ring is required, refers more particularly to the construction of an expansible tubular ring to inclose a spring or springs, and to act upon the packing-rings of a piston to produce a vertical and a lateral pressure, and to avoid the wear which so rapidly takes place between uncovered or uninclosed coiled springs and such packing-rings. The very considerable pressure put upon such springs vertically causes each coil of the spring to wear a corresponding groove in the rings, which prevents the free expansive lateral action of the spring. My interposed metallic tubes prevents this wear.

The annexed sheet of drawings will clearly illustrate my invention.

Similar letters of reference indicate similar parts in any of the figures.

Figure 1:
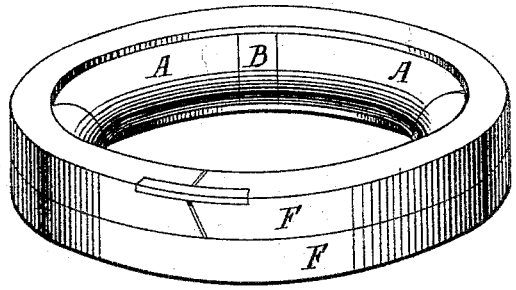
Figure 2:
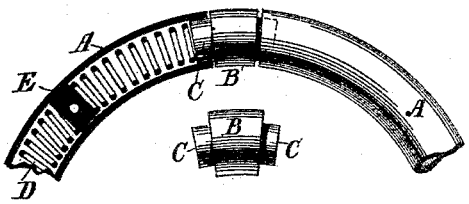
Figure 3:
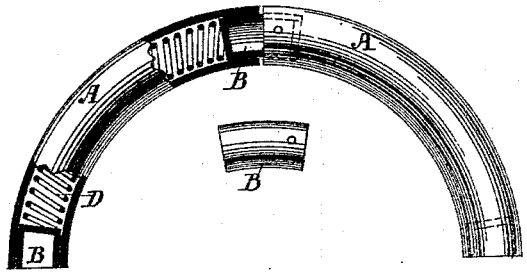
Figure 3:
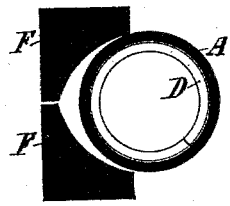
Figure 3:
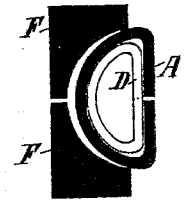

Figure 1 is a perspective view of a pair of piston packing-rings fitted with coiled springs within an expansible tubular ring according to this invention; Fig. 2, a plan of a portion of said tubular ring, part being shown in section, while the plug or slide-block is shown separately; Fig. 3, a similar plan illustrating a modified arrangement of the spring and the slide-block; Fig. 4, a cross-section of the rings and packing enlarged, and Fig. 5 a cross-section showing a ring semicircular in cross-section.

In carrying the invention into practice, as shown in the drawings, I use four or more lengths of metallic pipe or tubing A, curved to the desired radius, and so that when put together with the intermediate plugs or slide-blocks B they will form a complete circle. I connect these sections of tubing by means of solid or tubular plugs or slide-blocks B, the ends of which (marked C) slide easily in and out of the ends of the tubes A, the enlarged center portion forming a stop for the ends of the tubes to abut against. Inside the tubes A, I place suitably-coiled springs D, which may extend the whole length of each tube and bear at each end against the slide-block, as before described; or short springs may be used—such as shown in Fig. 2—bearing against a stop-piece E, secured centrally in the tube between each end.

The tubes A may be made from solid drawn tubing, or the edges may simply be drawn together. The cross-section may be circular, as in Fig. 4, semicircular, as in Fig. 5, or of other suitable cross-section, and the springs D may also be varied to suit the configuration of the said tubes A, as illustrated in Figs. 4 and 5. A coil of suitable wire for small sizes of the springs D may be used in its straight form just as it leaves the mandrel upon which it is coiled; but I prefer to give the heavier springs a permanent segmental curve, corresponding to that of the tubes A, to enable them to work freely inside the said tubes.

The slide-blocks or connections B may be made from a piece of tubing of smaller diameter than the tubes A, and the ends may be left open or may be closed, as preferred. They may be secured at one end to a tube-section by a cross-pin, as in Fig. 3, or by any other suitable means or appliances.

The action of the springs D is to press the ring sections or tubes A apart, thereby enlarging the diameter of the ring; and it will be seen on looking at the sectional view, Fig. 4, that such enlargement of diameter will not only expand the packing-rings, but will press them apart vertically. To this end the packing is divided both circumferentially and radially, as usual, and its back is provided with a circumferential concavity formed partly in each of the packing-rings F to coact with the wider convex periphery of the tubular ring. By inclosing the springs in tubes they are afforded protection from unequal strains and are not so liable to fracture or to get clogged with dirt; also, the action of the tubular ring-sections against the packing-rings F is smooth and equally divided upon all parts of the circle.

It will be evident that short lengths of springs—such as I have described—will be much easier to manufacture and to harden and temper than longer coils; also, that in case of accidental fracture a short length will be more readily replaced than a complete coil, and in many cases a stop-piece put between the points of fracture will be all the repair necessary to resume work.

What I desire to secure by Letters Patent of the United States is—

1. In combination with expansible packing-rings, an expansible tubular ring within said packing-rings and coiled expanding-springs within said tubular ring, substantially as hereinbefore specified.

2. In combination with circumferentially and radially divided piston-packing having a concave back, an expansible tubular ring within the same having a convex periphery in contact with said concave back, and coiled expanding-springs within said tubular ring, substantially as hereinbefore specified.

3. In combination with expansible packing-rings and short coiled springs for expanding the same, an expansible ring composed of segmental tubes inclosing said springs, sliding connections between said tubes, and intermediate stop-pieces within the tubes, substantially as hereinbefore specified.

In testimony that I claim the foregoing as my own I have affixed hereto my signature, in presence of two witnesses, this 29th day of May, 1889.

A. T. ALLEN.

Witnesses:
 ROBT. F. DRURY,
 BERNARD E. DRURY.